US012788541B2

(12) United States Patent
Alhrashi

(10) Patent No.: US 12,788,541 B2
(45) Date of Patent: Nov. 10, 2026

(54) INTEGRATED 3D DIGITAL MODEL FOR DESIGNING DENTAL PROSTHESIS

(71) Applicant: Fadi Alhrashi, Herndon, VA (US)

(72) Inventor: Fadi Alhrashi, Herndon, VA (US)

( * ) Notice: Subject to any disclaimer, the term of this patent is extended or adjusted under 35 U.S.C. 154(b) by 938 days.

(21) Appl. No.: 18/146,544

(22) Filed: Dec. 27, 2022

(65) Prior Publication Data

US 2023/0200954 A1 Jun. 29, 2023

Related U.S. Application Data

(60) Provisional application No. 63/294,372, filed on Dec. 28, 2021.

(51) Int. Cl.
*A61C 13/00* (2006.01)
*A61C 8/00* (2006.01)
*A61C 9/00* (2006.01)

(52) U.S. Cl.
CPC .......... *A61C 13/0004* (2013.01); *A61C 8/008* (2013.01); *A61C 9/0053* (2013.01)

(58) Field of Classification Search
CPC ... A61C 13/0004; A61C 8/008; A61C 9/0053; A61C 8/005
See application file for complete search history.

(56) References Cited

U.S. PATENT DOCUMENTS

2022/0051406 A1* 2/2022 Jang ..................... A61C 9/0046
2022/0160478 A1* 5/2022 Mirelez, Jr. ............ A61C 8/005
2023/0000600 A1* 1/2023 Wong .................. A61C 9/0046
2023/0126119 A1* 4/2023 Koski .................. A61C 9/0006 433/214

OTHER PUBLICATIONS

Tallarico et al, "Digital Workflow for Prosthetically Driven Implants Placement and Digital Cross Mounting: a Retrospective Case Series" Prosthesis 2022, 4(3), 353-368 [retrieved from https://www.mdpi.com/2673-1592/4/3/29] (Year: 2022).*

(Continued)

*Primary Examiner* — Brian W Wathen
(74) *Attorney, Agent, or Firm* — Stanzione & Associates, PLLC; Patrick Stanzione

(57) ABSTRACT

A method for a making a dental prosthesis for a patient. The method comprises acquiring a first 3D x-ray image of the patient's jaw while in pre-procedure jaw position. The dental implant procedure is performed to install implant fixtures on the patient's jaw. After the procedure, a second 3D x-ray image of the patient's jaw is acquired. Bony landmarks are selected on the 3D x-ray images for registration and alignment of the two image datasets. This results in a composite jaw structure model. The method further comprises performing dental photogrammetry to create a 3D photogrammetric rendering of the implant abutments. The method further comprises performing intraoral scanning of the patient's mouth with an intraoral scanning probe to create an intraoral topographic impression. The 3D photogrammetric rendering, the intraoral topographic impression, and the composite jaw structure model are combined to create an integrated 3D model of the patient's mouth and jaw.

20 Claims, 9 Drawing Sheets

(56) References Cited

OTHER PUBLICATIONS

Surovas, A., "digital workflow for modeling of custom dental implants" 3D Printing in Medicine, pp. 1-19 [retrieved from https://link.springer.com/article/10.1186/s41205-019-0046-y]. (Year: 2019).*

Nilsson et al., "Virtual bite registration using intraoral digital scanning, CT and CBCT" Journal of Cranio-Maxillo-Facial Surgery 44, pp. 1194-1200 [retrieved from https://www.sciencedirect.com/science/article/pii/S1010518216301019]. (Year: 2016).*

James et al.,"Medical Image Fusion: a survey of the state of the art" (2014) Information Fusion, pp. 1-45 [retrieved from https://arxiv.org/pdf/1401.0166]. (Year: 2014).*

Li et al, "A pilot study of digital recording of edentulous jaw relations using a handheld scanner and specially designed headgear" (2018) *Sci Rep* 8:8975.

Fang et al, "A Technique for Digital Impression and Bite Registration for a Single Edentulous Arch" (2019) *J Prosthodont* 28(2):e519-e523.

* cited by examiner

INTEGRATED 3D DIGITAL MODEL FOR DESIGNING DENTAL PROSTHESIS

TECHNICAL FIELD

This invention relates to a digital workflow for creating a model that can be used for fabricating custom dental prosthesis.

BACKGROUND

Dental prosthetic restoration often requires designing and creating custom dental prosthetics for the patient. In the past, physical molds of the patient's oral cavity were made to serve as a model for designing dental prosthetics. But the modern practice of dental prosthodontics is moving towards digital 3D virtual models of the oral cavity or jaw to design dental prosthetics. Examples of such digital workflow processes are described in Marco Tallarico et al, "Digital Workflow for Prosthetically Driven Implants Placement and Digital Cross Mounting: A Retrospective Case Series" (2022) *Prosthesis,* 4(3):353-368; and Andrejus Surovas, "A digital workflow for modeling of custom dental implants" (2019) 3*D Printing in Medicine,* 5:9; all the preceding are incorporated by reference herein.

There is a need for continued improvements in making digital anatomical models of the patient's jaw for designing patient-specific prosthesis. One particular need is to assimilate the patient's pre-procedure bite record into the design model. Bite registration indicates how the patient's upper and lower teeth are positioned in relation to one another. This may be a problem because the post-procedure bite alignment often differs from the pre-procedure bite record, particularly when an extensive dental restoration is performed.

The process of bite registration is described in Weiwei Li et al, "A pilot study of digital recording of edentulous jaw relations using a handheld scanner and specially designed headgear" (2018) *Scientific Reports,* 8:8975; and Philippe Nuytens et al, Reliability and Time Efficiency of Digital vs. Analog Bite Registration Technique for the Manufacture of Full-Arch Fixed Implant Prostheses" (2022) *J. Clin. Med.,* 11(10):2882; and Johanna Nilsson et al, "Virtual bite registration using intraoral digital scanning, CT and CBCT: In vitro evaluation of a new method and its implication for orthognathic surgery" (2016) *J Craniomaxillofac Surg.,* 44 (9): 1194-200; all the preceding are incorporated by reference herein.

SUMMARY

This invention is for a method of making a dental prosthesis for a patient. Alternately, this invention may be considered a method of designing a dental prosthesis for a patient. All the various anatomic models referred to herein are digital models. The method comprises having a first 3D x-ray image of the patient's jaw while in pre-procedure jaw position. This 3D x-ray image may be acquired by performing cone beam computed tomography (CT) scanning of the patient.

This pre-procedure jaw alignment may be designated in various ways such as stable jaw position, natural resting position, ideal jaw position, etc. This pre-procedure jaw alignment could be the alignment where the teeth, joints, and muscles all act together well in coordinated fashion. In some embodiments, the jaw position is in bite position. As used herein, "bite position" means that the jaws are in closed position as opposed to open position. In this closed position, at least one of the upper and lower teeth are touching each other or overlapping in vertical position, or the jaws are in a relaxed adduction position in otherwise edentulous patients. In clinical terms, this bite position may be the centric position of the mandible where the condyles are located deep in the mandibular fossae without pressure or tension and where maximal intercuspation and centric loading of the teeth exist. The invention could be useful to design a prosthesis that restores this centric occlusion or habitual intercus-pation position.

Dental Procedure. After acquiring this first 3D x-ray image, the patient undergoes a dental implant procedure to install implant fixtures on the patient's jaw. After the dental implant procedure, the method further comprises having a second 3D x-ray image of the patient's jaw. This is after the dental implant procedure and the jaw is in a post-procedure jaw position. Because the newly installed implants affect the jaw alignment, this post-procedure jaw alignment may differ from the pre-procedure jaw alignment. In some embodiments, this post-procedure jaw position is in bite position, which may be different from the pre-procedure bite position. This second 3D x-ray image may be acquired by performing cone beam computed tomography (CT) scanning of the patient.

Composite Jaw Structure Model. There are now first and second 3D x-ray image datasets. To register the two sets of images, one or more bony alignment landmarks are selected on the first 3D x-ray image, along with the corresponding landmarks on the second 3D x-ray image. These landmarks may be selected manually or by an automated process. By registering the landmarks, the two sets of images are combined using any suitable image processing technique to create a composite jaw structure model.

The step of combining two or more digital image datasets as indicated herein can be performed by any suitable image processing technique for merging, blending, superimposing, or fusion. Examples of such techniques are described in Alex James et al, "Medical image fusion: A survey of the state of the art" (2014) *Information Fusion,* 19:4-19; which is incorporated by reference herein. Whatever technique that is used, the result of the image combining step is a composite image. This composite image may be in any useful format such as superimposed images (both images are shown together) or a fusion image (e.g. a single unitary image that represents an average of the two images).

Implant Geometry. To acquire a 3D rendering of the implant fixtures/abutments and their spatial relationship, the method further comprises performing dental photogrammetry of the implant abutments. This is performed using a photogrammetry camera (e.g. stereoscopic). This gives a 3D photogrammetric rendering of the implant abutments that gives the relative spatial positioning of the implants (i.e. the geometry of the multiple implant fixtures/abutments).

To facilitate identification of the implants, special coded flag abutments could be used. These coded flag abutments may be installed in any suitable manner. For example, the initial abutments may be healing caps, which are temporarily replaced with the flag abutments. After performing the dental photogrammetry, the flag abutments are removed and the healing caps are reinstalled. An example of using special flag abutments for dental photogrammetry is described in Guillermo Pradies et al, "Using stereophotogrammetric technology for obtaining intraoral digital impressions of implants" (2014) *J Am Dent Assoc.,* 145 (4): 338-44; and Luís Azevedo et al, "Photogrammetry Technique for the 3D Digital Impression of Multiple Dental Implants" (2019), in *VipIMAGE* 2019 (pp. 615-619), which are incorporated by reference herein.

Intraoral Topography. To acquire a topographic rendering of the inside of the patient's mouth, the method further comprises performing intraoral imaging of the patient's mouth with an intraoral scanning probe. This creates an intraoral topographic impression. Represented in this digital impression are the dental, palatal, alveolar, and oral cavity structures. Also represented in this digital impression are the dental implants.

Integrated 3D Model Topography. The composite jaw structure model, 3D photogrammetric rendering, and intraoral topographic impression are combined to create an integrated 3D digital model of the patient's mouth and jaw. This integrated 3D digital model is used to fabricate the dental prosthesis for the patient. The benefit of this integrated 3D model is that the patient's pre-procedure bite position is assimilated into the model data so that a better fitting prosthesis can be designed for the patient.

In some embodiments, all three of the models have image elements that represent the dental implants (fixtures or abutments). For aligning the 3D models, the dental implants (fixtures or abutments) may serve as registration elements. This selection of the dental implants as registration elements may be performed manually or by an automated process that automatically recognizes the dental implants. The alignment process may be performed manually or by an automated process. For example, the image alignment may be performed by calculating the best-fit alignment of the dental implants represented in each of the three models. Image combination of the three models may be performed in any suitable sequence. Combined models that serve as an intermediate step may be referred to herein as transitional models. In some embodiments, the 3D photogrammetric rendering is digitally combined with the intraoral digital impression to create a composite intraoral/dental model. Then the composite intraoral/dental model is digitally combined with the composite jaw structure model to create the integrated 3D digital model.

Fabrication. The prosthesis is fabricated using the integrated 3D digital model (e.g. as a virtual template). The fabrication process could be performed in an external fabrication facility. In such cases, the integrated 3D digital model could be shared in any suitable manner, such as direct transmission to the fabrication facility or upload to a cloud computer for sharing with the fabrication facility. Upon receipt of the fabricated prosthesis, the clinician installs the prosthesis onto the implant fixtures.

Computer Software. Another aspect of this invention is a non-transitory computer-readable medium encoded with instructions that when executed by a computer cause the computer to perform operations that implement the method described herein on the computer.

DETAILED DESCRIPTION

To assist in understanding the invention, reference is made to the accompanying drawings to show by way of illustration specific embodiments in which the invention may be practiced. The drawings herein are not necessarily made to scale or actual proportions. For example, lengths and widths of the components may be adjusted to accommodate the page size.

Figure 1:
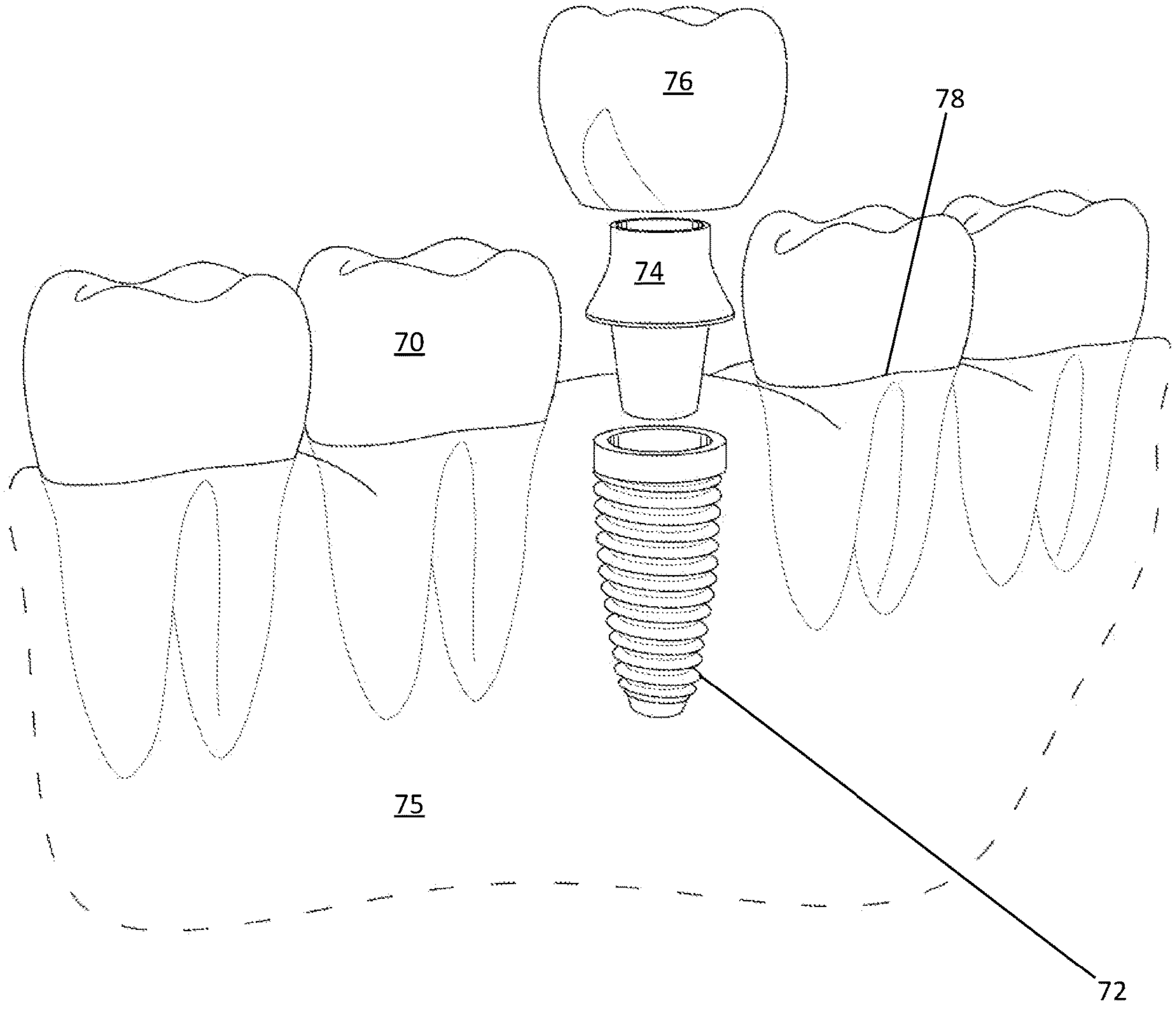
FIG. 1 (prior art)
FIG. 1 shows an example of how a typical dental implant is installed.

FIG. 1 (prior art) shows an example of a conventional dental implant. The tooth implant shown here comprises an implant fixture 72, an abutment 74, and a crown prosthesis 76. At the position of the missing tooth, the implant fixture 72 is embedded into the jaw bone 75. An abutment 74 is affixed onto the implant fixture 72. Examples of abutment include healing caps, gingival formers, cover screws, etc. The abutment 74 protrudes above the soft tissue level (e.g. gingiva; in this case, above the gumline 78). The crown prosthesis 76 is then affixed onto the abutment 74. Other examples of prosthesis that could be supported by the implant fixture/abutment include bridges, dentures, or other appliances used in dental restoration. Also shown here are some native teeth 70.

Figure 2:
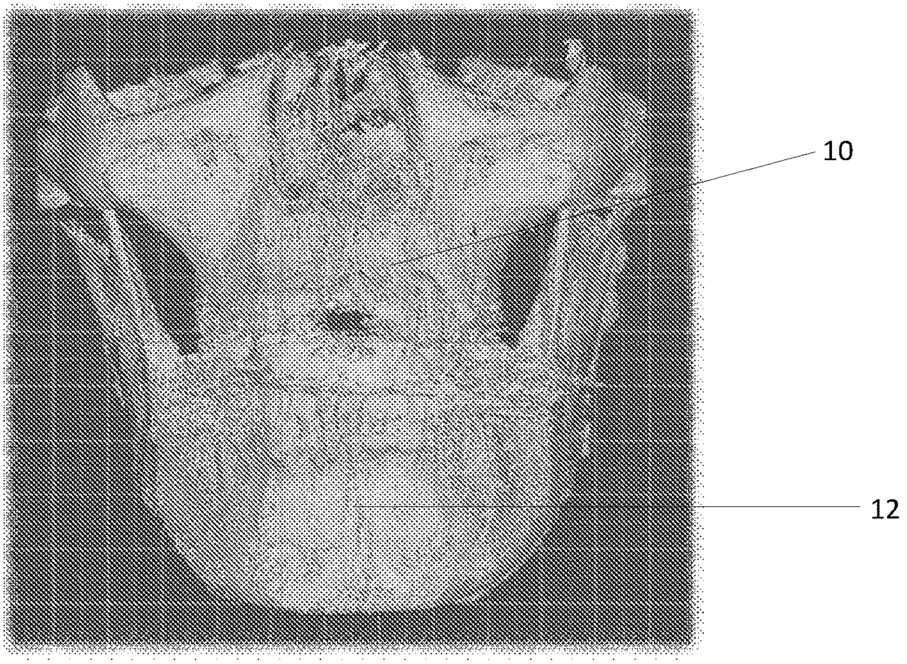
FIG. 2 shows a 3D rendering of a pre-operative CT scan image obtained on the patient's jaw in ideal bite position to record the proper jaw relation.
Figure 3:
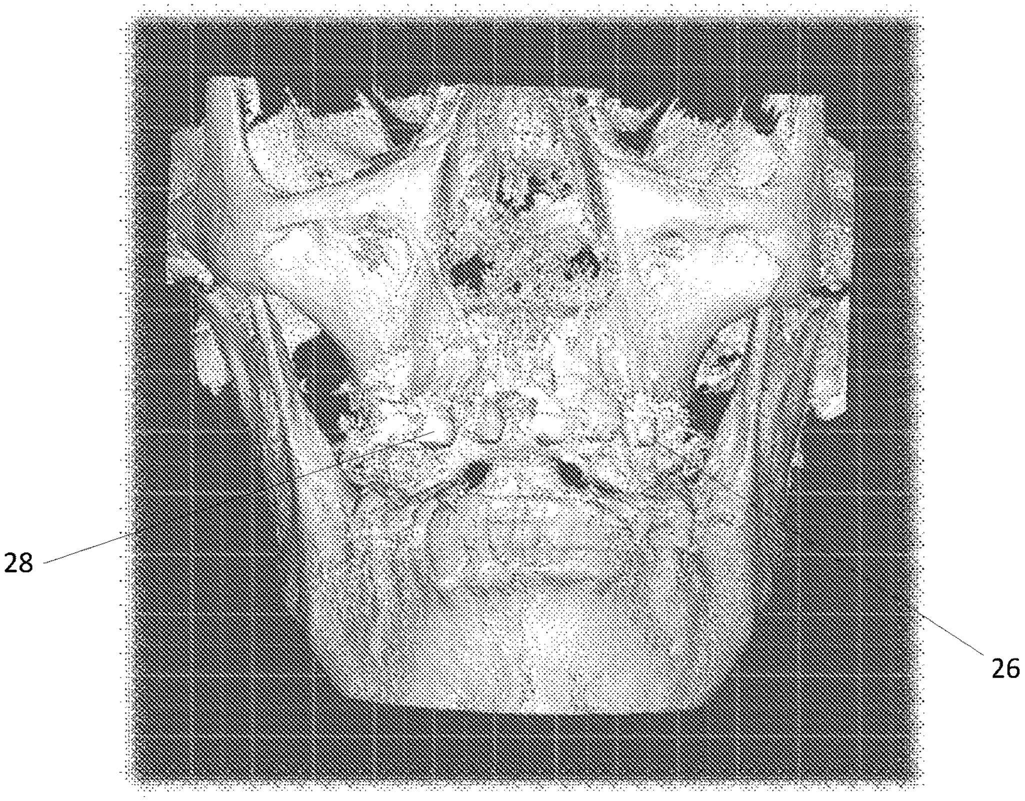
FIG. 3 shows a 3D rendering of a post-operative CT scan that is obtained after the dental implant procedure is performed.

FIGS. 2-8 show an example of a work process of this invention. This is for a patient who is receiving a dental implant procedure or full mouth restorative procedure and being fitted for a prosthesis. FIG. 2 shows a 3D rendering of a pre-operative CT scan (x-ray computed tomography) image obtained on the patient's jaw (maxilla 10 and mandible 12) in ideal bite position to record the proper jaw relation (bite record). After this initial CT scan, the patient undergoes the dental implant or restoration procedure. During the dental procedure, a metal healing cap is mounted on one or more tooth implants. FIG. 3 shows a 3D rendering of a post-operative CT scan that is obtained after the dental implant procedure is performed.

Whereas the pre-procedure CT scan shows the original and natural jaw alignment, the post-procedure CT scan shows the implant position information with altered jaw alignment. To facilitate clinical visualization and interpretation, the two CT images (pre and post) are combined into a single composite image. To perform this image fusion, the two CT images are registered to each other. The two images are registered using common radiologic landmarks on both images. Examples of anatomical landmarks that could be selected include floor of the nose, nasal spine, floor of the eye, infraorbital foramen, mental foramen, lower border of the mandible, angle of the mandible, coronoid process, zygomatic process, etc. One or more of such radiologic landmarks may be selected for image registration.

Figure 4A:
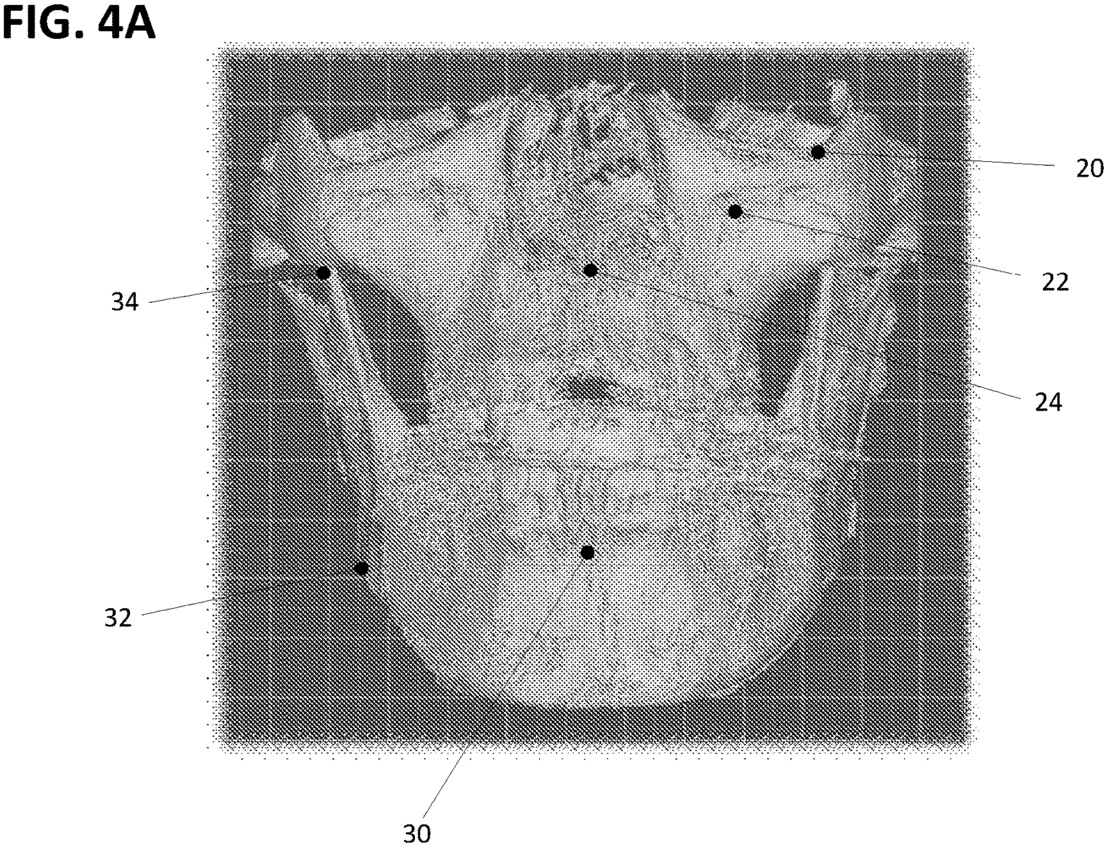
FIG. 4A shows where the user selects six landmarks on the post-op CT image for registration of the two CT images.
Figure 4B:
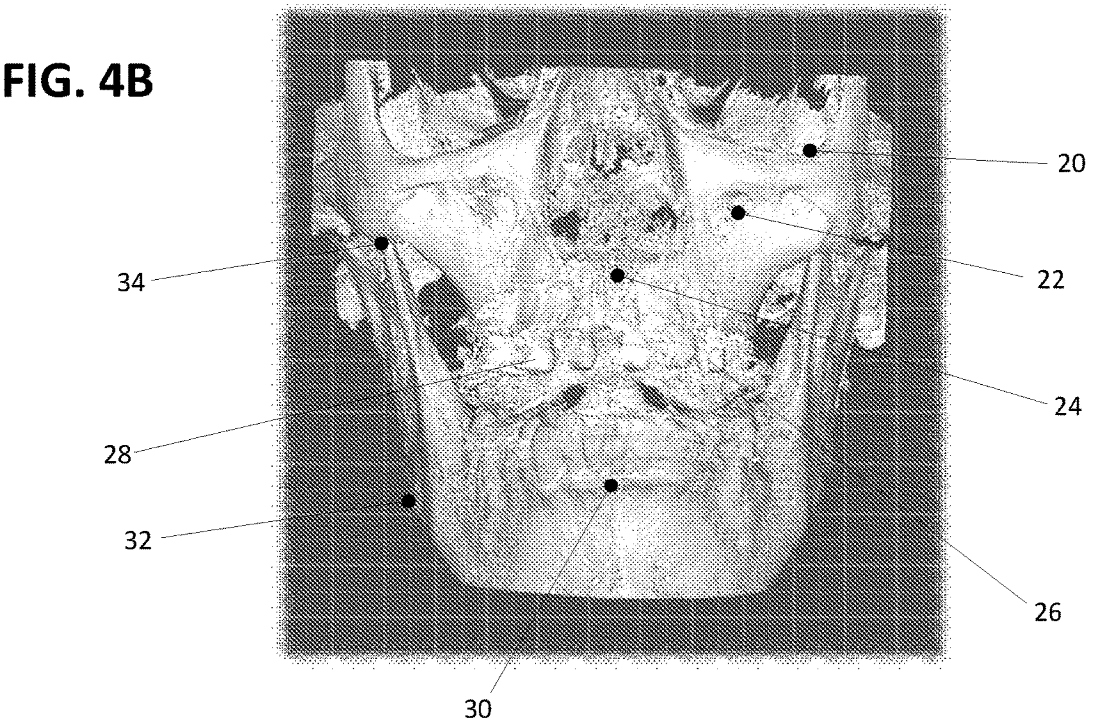
FIG. 4B shows the corresponding landmarks on the pre-op CT scan image.

To facilitate independent alignment of the maxilla and mandible, the user can select landmarks on both the maxilla and mandible. As shown in FIG. 4A, in this example, the user selects six landmarks on the post-procedure CT image for registration of the two CT images. Three landmarks selected for the maxilla are floor of the eye (landmark 20), infraorbital foramen (landmark 22), and floor of the nose (landmark 24). Three landmarks selected for the mandible are mental foramen (landmark 30), angle of the mandible (landmark 32), and coronoid process (landmark 34). FIG. 4B shows the corresponding landmarks on the pre-procedure CT scan image. Alternatively, the software package may automatically identify landmarks on the images to use for the registration process.

Figure 5:
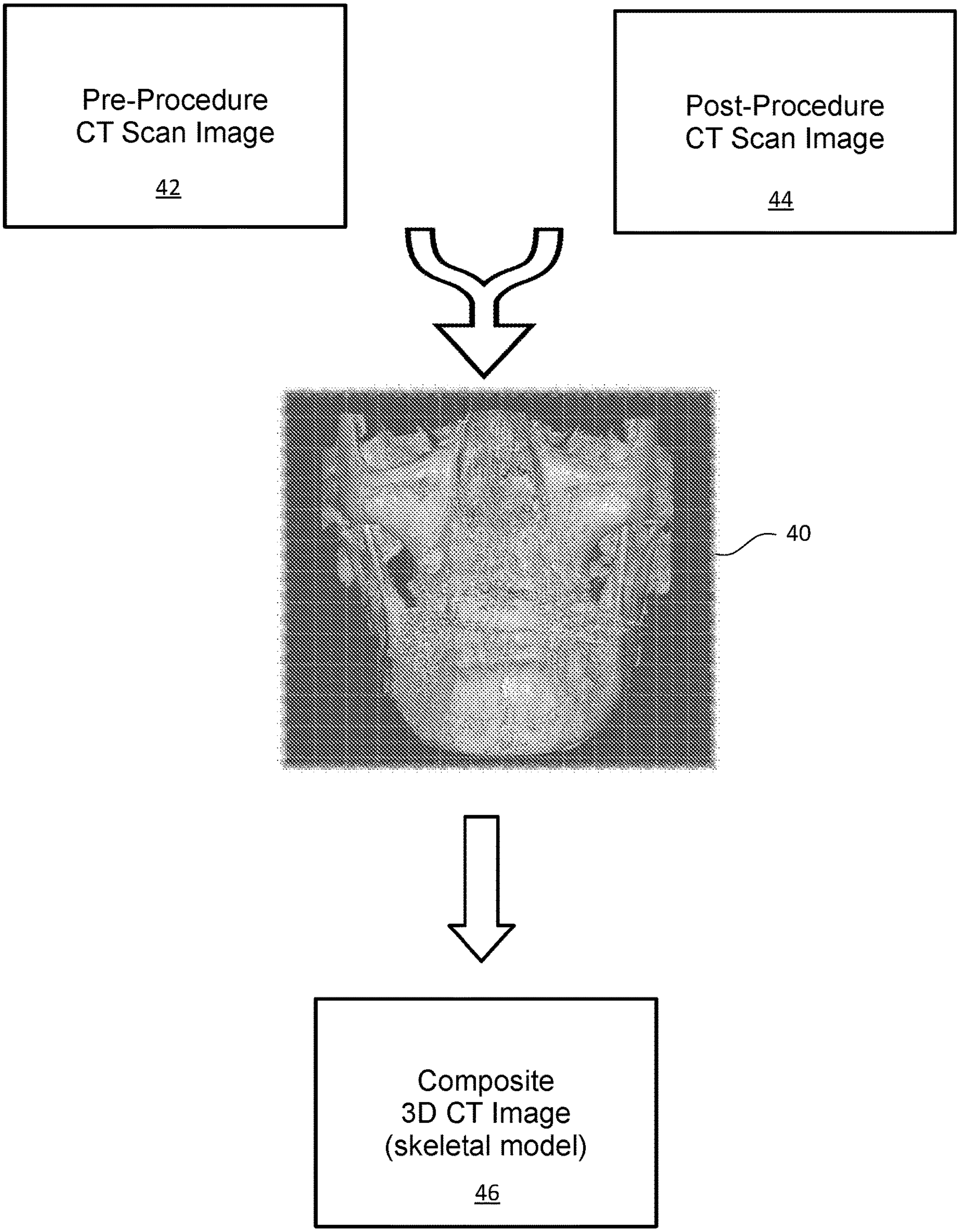
FIG. 5 shows the two CT scan images merged as aligned from the image registration process.

FIG. 5 shows how the two CT scan images are merged to create the composite 3D skeletal model of the patient's jaw structure. The pre-procedure CT scan image 42 is aligned with the post-procedure CT scan image 44 by an image registration process. The resulting superimposed aligned image 40 may be verified or adjusted as needed by visual inspection. The two CT scan images of the jaw are then combined into a single 3D rendered image by using any suitable image fusion technique. The simplest technique for doing this is to take the average of two input images. Examples of more sophisticated image fusion techniques include high-pass filtering techniques, intensity-hue-saturation (IHS) transform-based techniques, principal component analysis (PCA)-based techniques, wavelet transform techniques, pairwise spatial frequency matching, etc. There are a variety of image analysis software that can perform this image fusion. This results in a single CT scan image structure that merges the pre-op CT and post-op CT scans to give a 3D skeletal model 46 that has the patient's jaw bite relationship and implant position information upon which the dental prosthesis can be designed.

With the dental implants now installed, a dental prosthesis is designed for the patient. To aid in prostheses design, a 3D digital model of the teeth (if any), implants, adjacent soft tissues, and intraoral contours is constructed. This is done in two stages with dental photogrammetry and 3D intraoral scanning. Dental photogrammetry is performed to determine the geometric relationship between the implants. For this, the conventional abutments may be used, or the implants may be coded with screw-on flag abutments. Stereoscopic images of the flags are captured with a stereo-camera. By using photogrammetry, the relative positions (x, y, z coordinates) of the implants and the distances therebetween are calculated and registered.

Figure 6:
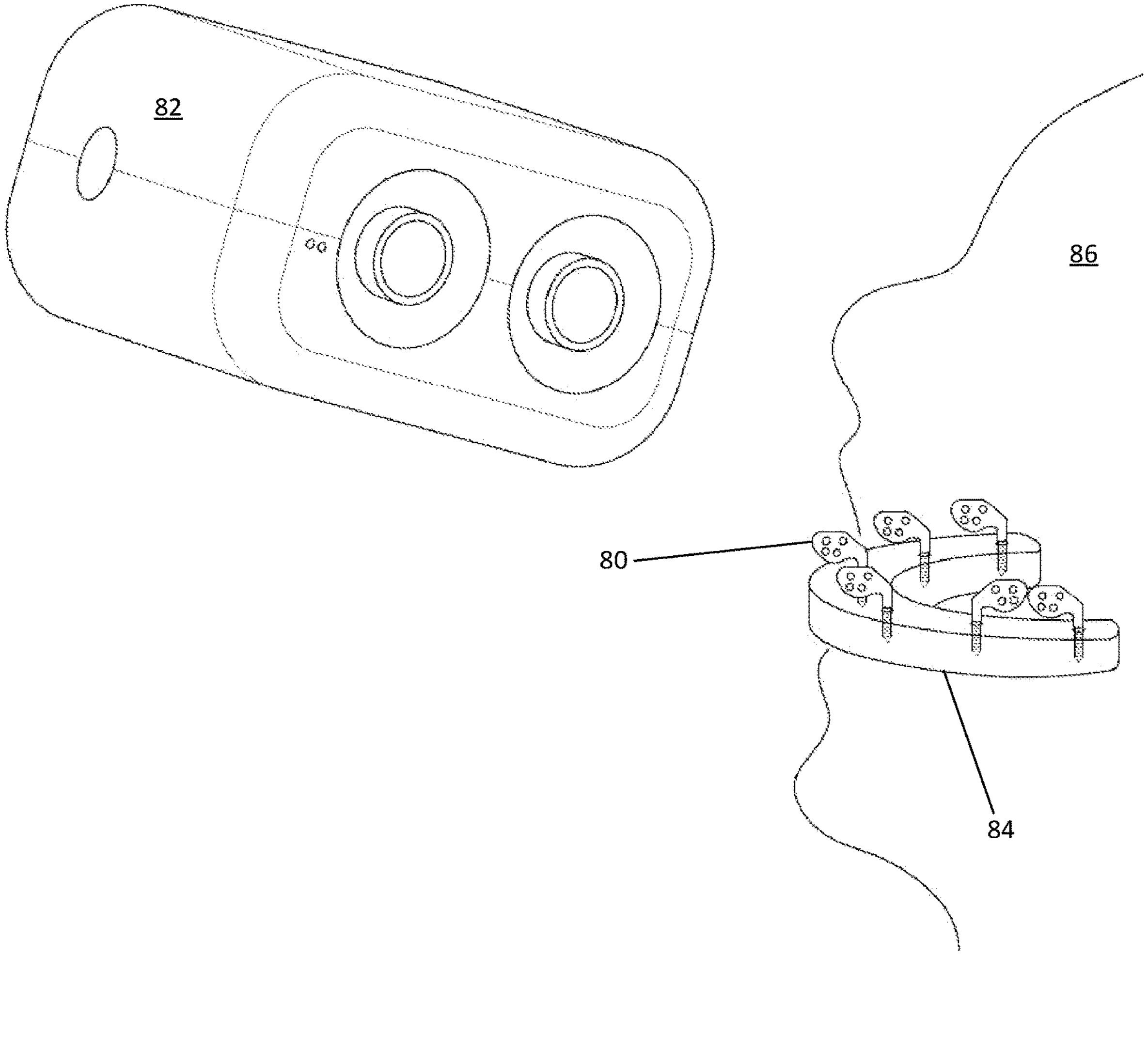
FIG. 6 (prior art)
FIG. 6 shows an example of how dental photogrammetry is performed.

FIG. 6 (prior art) shows an example of how photogrammetry flag abutments could be used for performing the dental photogrammetry on a patient 86. In this scenario, a series of flag abutments 80 are screwed onto the already-installed implant fixture embedded in the lower jaw 84. The flags 80 are specially coded with a pattern of dots that are unique for each implant. Thus, the implants are uniquely identified by the coded dots. Multiple views inside the patient's mouth are captured with the stereoscopic camera 82. These views are used to generate a 3D photogrammetric rendering that contains the identity and relative spatial positioning of the implants. The flag abutments 80 are then replaced with treatment abutments (e.g. healing caps).

Figure 7:
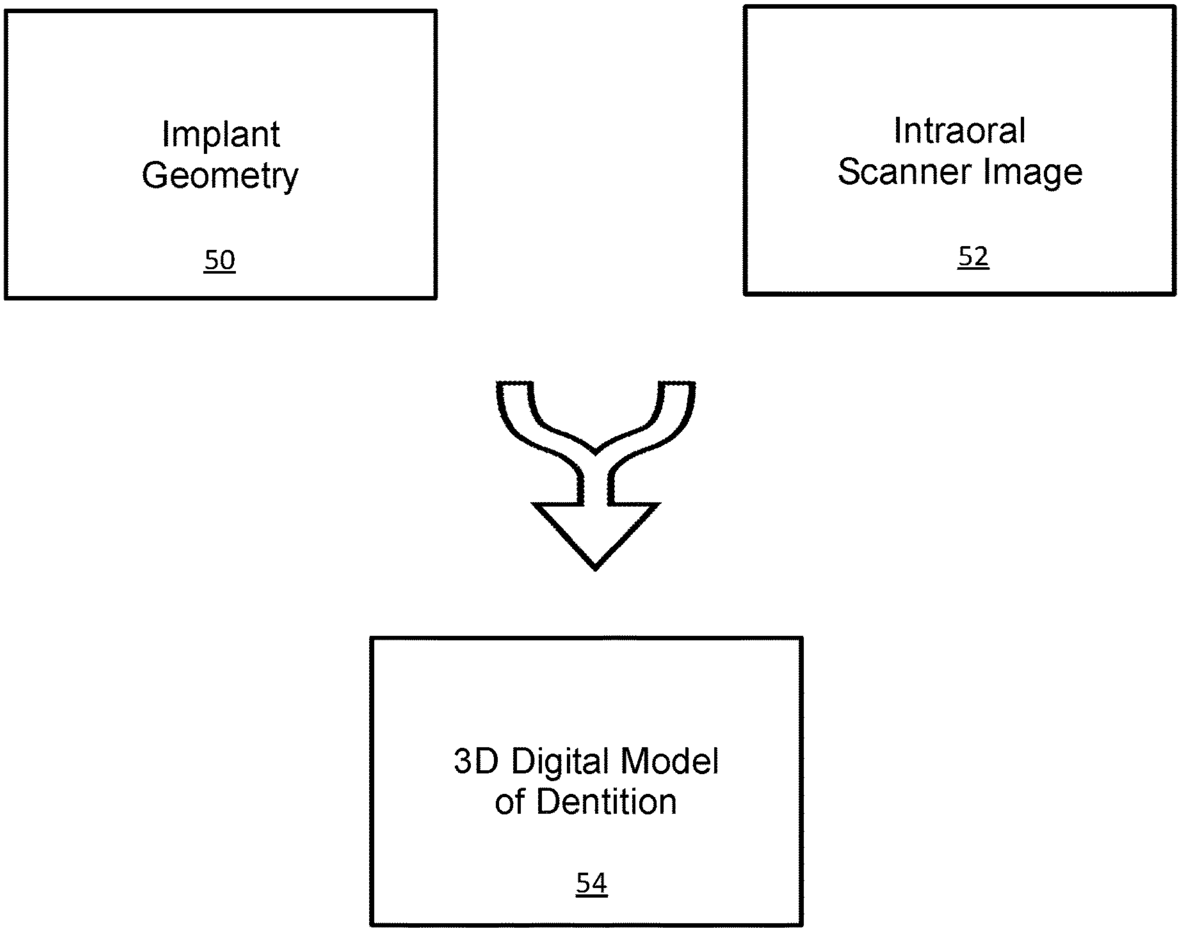
FIG. 7 shows the 3D intraoral image superimposed on the implant geometry using best-fit alignment to generate an integrated 3D digital model of the patient's oral dentition.

Next, to add the intraoral soft tissue contour data to the model, a 3D intraoral image from inside the mouth is acquired by probing with an intraoral scanner. As shown in FIG. 7, the 3D intraoral image data 52 is superimposed on the implant geometry data 50 using best-fit alignment of the registered implants to generate a composite dentition model 54 that incorporates information on the teeth (if any), implant positions, intraoral topography, and soft tissues contours.

Figure 8:
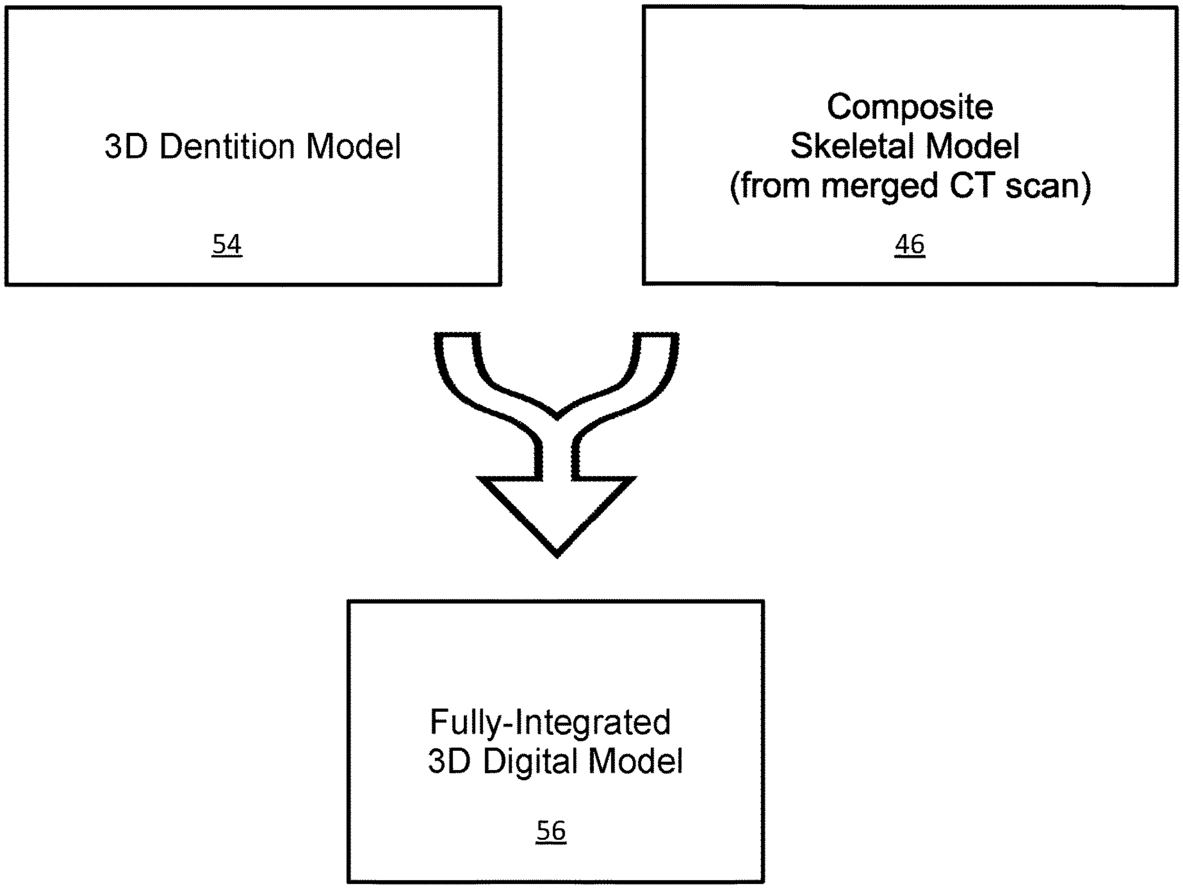
FIG. 8 shows how the 3D dentition model is fitted onto the composite jaw structure model to create the integrated 3D digital model.

As shown in FIG. 8, this composite dentition model 54 is fitted onto the composite jaw structure model 46 defined by the digital bite from the merged CT scan. Using the abutments (e.g. healing caps) as reference markers, the composite dentition model 54 is aligned with the digital jaw structure 46. Thus, this workflow process merges multiple different imaging modalities into a single integrated 3D model 56 that can be used as a template for fabricating a custom-designed prosthesis for the patient.

Figure 9:
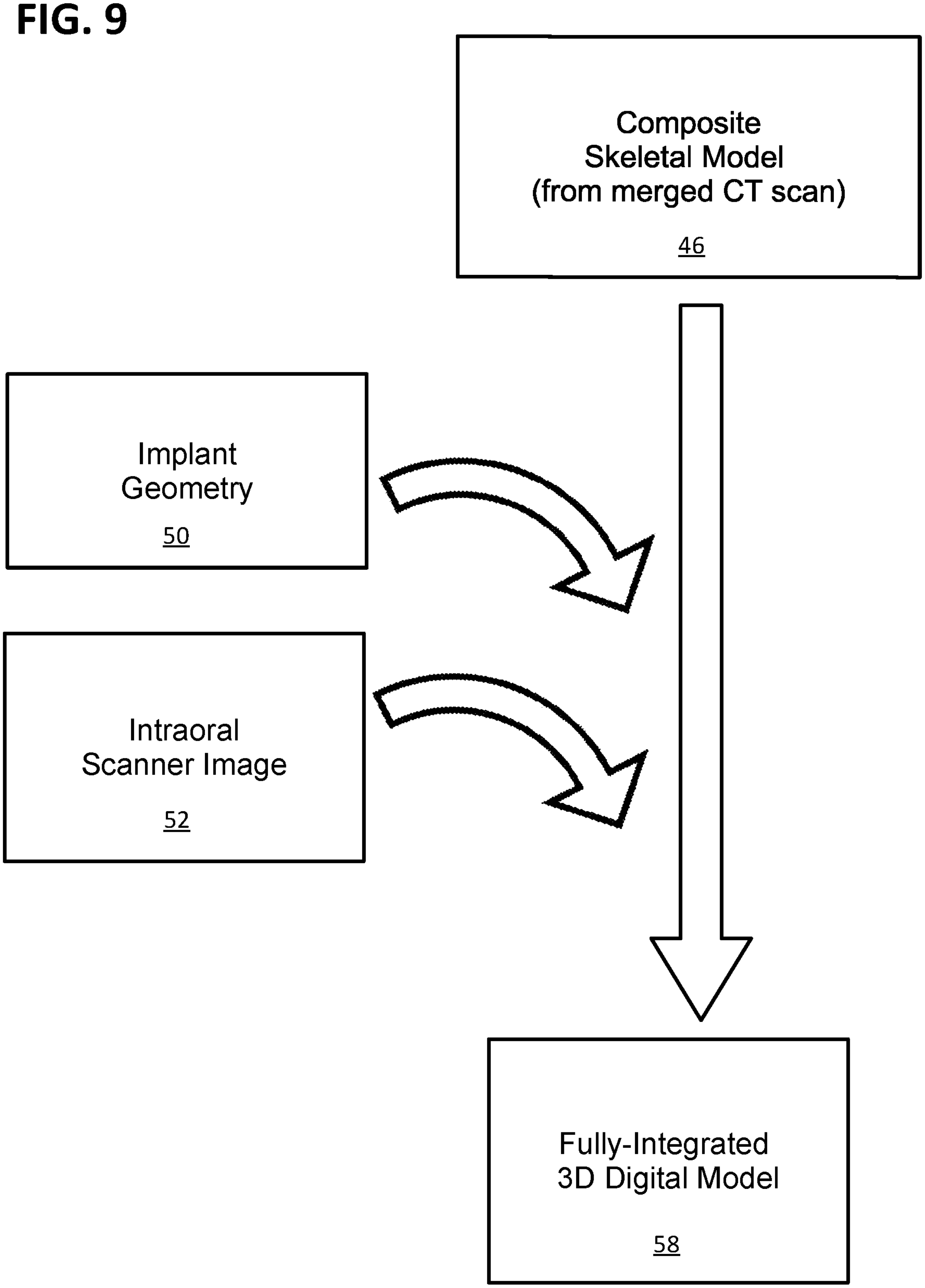
FIG. 9 shows an alternate workflow sequence.

The sequence of image processing steps does not necessarily have to be in the order shown above. Any suitable sequence of steps that results in the final integrated 3D model may be used. An example of an alternate workflow sequence is shown in FIG. 9. Here, the implant geometry 50 is first fitted onto the jaw structure model 46 defined by the digital bite from the merged CT scan. Next, the intraoral soft tissue contour data 52 (from the intraoral scanner) is added to the model. The resulting output is an overall integrated 3D model 58 that can be used as a template for fabricating a custom-designed prostheses for the patient. As mentioned above, this invention encompasses any variation of the sequence of steps that would result in the final integrated 3D model.

Figure 10:
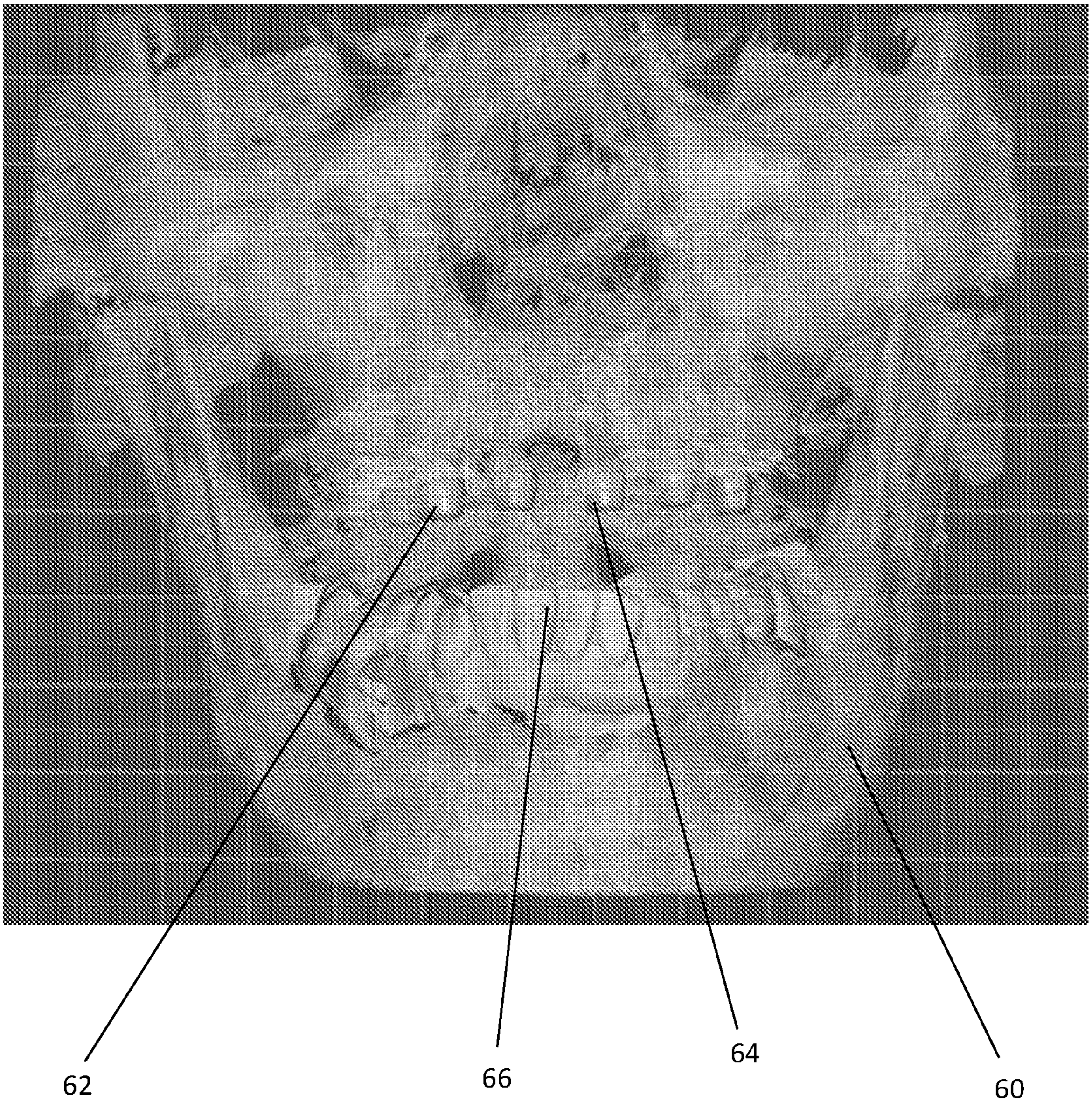
FIG. 10 shows an example of an integrated 3D digital model.

FIG. 10 shows an example of a final integrated 3D model. Shown in this model is the skeletal frame 60 from the merged CT scan. Superimposed thereon are the images of the implants (62, 64, and others) obtained from the intraoral scanning. Also shown are the native teeth 66 and soft tissue structures obtained from the intraoral scanning. The relative spatial positioning of the implants (62, 64, and others) obtained from the dental photogrammetry are also contained in this dataset.

Clinical Examples

The workflow process of this invention was tested in a clinical trial setting. Patient #1 was a 62 year-old woman with unrestorable upper dentation due to advanced periodontal disease and failing old restorative work. The patient received a full upper jaw implant. Pre-surgical CT scan were performed while patient was biting with ideal upper and lower jaw relationship. For the dental procedure, all her upper teeth were extracted, and the surgical site was irrigated and debrided to remove infections and granulation tissue. Bone reduction was performed to flatten the ridge and establish space for the final prosthesis. Six implants were placed in the area of teeth number 4, 6, 8, 9, 11, and 13 followed by placement of six different angled multi-units abutments (MUA).

Photogrammetric flags (I-CamBodies) were placed on the MUA and photogrammetric scanning was performed (I-Cam 4D scanner). Then a MUA healing cap was placed and intraoral scan performed (Cerec scanner). After that a post-surgical CT scan were taken (Sirona CT scan machine). Thus, her jaw bite relation was recorded by the pre-surgical CT scan and the implant position was recorded by the post-surgical CT. The two scans were merged into a composite skeletal model that included the ideal jaw position and implant position information. The intraoral scan data and the dental photogrammetry were merged with the composite skeletal model.

The implant supported bridge was designed on the composite skeletal model using Exocad software. A Nanoceramic implant bridge was milled and fabricated overnight. This was delivered the next day to patient. The patient reported high satisfaction with her new bridge setting.

Patient #2 was a 57 year-old woman with missing and failing unrestorable upper and lower dentation due to advanced periodontal disease and caries. The patient received a full upper and lower jaw implant. Pre-surgical CT scan was performed with the patient biting in ideal upper and lower jaw relationship. For the dental procedure, all her teeth were extracted, and the surgical site was irrigated and debrided to remove infections and granulation tissue. Bone reduction was performed to flatten the ridge and establish space for the final prosthesis. Six implants were placed in the area of teeth numbers 4, 6, 8, 9, 11, and 13 for the upper jaw; six implants were placed in the area of teeth numbers 19, 21, 23, 26, 28, and 30 for the lower jaw, followed by placement of six different angled multi-unit abutments (MUA) in each arch.

Photogrammetric flags (I-CamBodies) were placed on the MUA and photogrammetric scanning was performed (I-Cam 4D scanner). Then a MUA healing cap was placed and intraoral scan performed (Cerec scanner). Afterwards, a post-surgical CT scan were taken (Sirona CT scan machine). Thus, her jaw bite relation was recorded by the pre-surgical CT scan and the implant position was recorded by the post-surgical CT scan. The two scans were merged into a composite skeletal model that included the ideal jaw position and implant position information.

The intraoral scan data and the dental photogrammetry were merged with the composite skeletal model.

The upper and lower bridges (supported by the implants) were designed on the composite skeletal model using Exocad software. Two Nanoceramic implant bridges were milled and fabricated overnight. These were delivered the next day to the patient. The patient reported high satisfaction with her new bridge setting.

Patient #3 was a 25 year old man with severe uncontrolled caries in almost all his teeth requiring upper and lower full mouth crowns and bridge rehabilitation. Pre-surgical CT scan was performed while patient biting in ideal upper and lower jaw relationship. Caries were removed from all teeth and root canal treatment was performed on teeth #2, 15, and 30. All teeth were restored with composite restoration followed with full upper and lower crowns. Temporary crowns were fabricated according to a new smile design and new bite. The temporary crowns were tested for two month and patient adapted very well to the new bite and was happy with the cosmetic effect. The temporary crowns were removed and final impressions for the upper and lower jaw were taken by intraoral scanning (Cerec scanner). Then a post-surgical CT scan were taken (Sirona CT scan machine) and the temporary crown recemented.

The pre- and post-CT scans were merged into a composite skeletal model that included the ideal jaw position and implant position information. The intraoral scan data and the dental photogrammetry were merged with the composite skeletal model. The crowns and bridges were designed on the composite skeletal model using the Exocad software. E-max (brand) crowns and bridges were milled and fabricated. These were delivered the next day to patient. The patient reported high satisfaction with his new crowns and bridge work.

The descriptions and examples given herein are intended merely to illustrate the invention and are not intended to be limiting. Each of the disclosed aspects and embodiments of the invention may be considered individually or in combination with other aspects, embodiments, and variations of the invention. In addition, unless otherwise specified, the steps of the methods of the invention are not confined to any particular order of performance. Modifications of the disclosed embodiments incorporating the spirit and substance of the invention may occur to persons skilled in the art, and such modifications are within the scope of the invention.

Any use of the word "or" herein is intended to be inclusive and is equivalent to the expression "and/or," unless the context clearly dictates otherwise. As such, for example, the expression "A or B" means A, or B, or both A and B. Similarly, for example, the expression "A, B, or C" means A, or B, or C, or any combination thereof.

The invention claimed is:

1. A method a making a dental prosthesis for a patient, comprising:

having a first 3D x-ray image of the patient's jaw while in pre-procedure jaw position;

performing a dental implant procedure to install implant fixtures on the patient's jaw, wherein the implant fixtures have abutments that protrude above a soft tissue level;

having a second 3D x-ray image of the patient's jaw, wherein the second 3D x-ray image is after the dental implant procedure and the jaw is in a post-procedure jaw position;

selecting a bony alignment landmark on the first 3D x-ray image;

selecting a corresponding alignment landmark on the second 3D x-ray image;

combining the first and second 3D x-ray images to create a composite jaw structure model;

performing dental photogrammetry of the implant abutments to create a 3D photogrammetric rendering of the implant abutments that gives the relative spatial positioning of the abutments;

performing intraoral scanning of the patient's mouth with an intraoral scanning probe to create an intraoral topographic impression;

combining the 3D photogrammetric rendering, the intraoral topographic impression, and the composite jaw structure model to create an integrated 3D model of the patient's mouth and jaw;

fabricating a custom dental prosthesis specific for the patient using the integrated 3D model.

2. The method of claim 1, wherein the step of selecting a bony alignment landmark on the first 3D x-ray image comprises selecting multiple such alignment landmarks.

3. The method of claim 2, wherein at least one bony alignment landmark and corresponding landmark is on a maxilla of the jaw, and wherein at least another bony alignment landmark and corresponding landmark is on a mandible of the jaw.

4. The method of claim 1, wherein the post-procedure jaw position is different from the pre-procedure jaw position.

5. The method of claim 1, wherein the implant abutments are healing abutments and further comprising, prior to performing dental photogrammetry, replacing the healing abutments with coded flag abutments.

6. The method of claim 1, wherein the dental prosthesis is a crown, bridge, or denture.

7. The method of claim 1, further comprising performing cone beam computed tomography (CT) scanning of the patient to obtain the first 3D x-ray image and the second 3D x-ray image.

8. The method of claim 1, further comprising installing the dental prosthesis onto the implant fixture.

9. The method of claim 1, wherein the implant abutments used in the dental photogrammetry are coded flag abutments.

10. The method of claim 1, wherein the implant abutments used in the intraoral scanning are healing abutments.

11. The method of claim 1, wherein the step of combining the 3D photogrammetric rendering, intraoral topographic impression, and the composite jaw structure model to create an integrated 3D model of the patient's mouth and jaw comprises:

combining the 3D photogrammetric rendering of the implant abutments with the intraoral topographic impression to create a composite intraoral/implant model;

combining the composite jaw structure model with the composite intraoral/implant model to create an integrated 3D model of the patient's mouth and jaw.

12. The method of claim 11, wherein the step of combining the composite jaw structure model with the composite intraoral/implant model is performed manually or by automated process.

13. The method of claim 11, wherein the step of combining the 3D photogrammetric rendering of the implant abutments with the intraoral topographic impression involves the step of registering the position of the implant abutments.

14. The method of claim 1, wherein the step of combining the 3D photogrammetric rendering, the intraoral topographic impression, and the composite jaw structure model to create an integrated 3D model of the patient's mouth and jaw comprises:

combining the 3D photogrammetric rendering of the implant abutments with the composite jaw structure model to create a transitional model;

combining the transitional model with the intraoral topographic impression to create an integrated 3D model of the patient's mouth and jaw.

15. A non-transitory computer-readable medium encoded with instructions that when executed by a computer cause the computer to perform operations comprising:

receiving a first 3D x-ray image of the patient's jaw while in pre-procedure jaw position;

receiving a second 3D x-ray image of the patient's jaw, wherein the second 3D x-ray image is after a dental implant procedure and the jaw is in a post-procedure jaw position;

receiving a user selection of a bony alignment landmark on the first 3D x-ray image;

receiving a user selection of a corresponding alignment landmark on the second 3D x-ray image;

combining the first and second 3D x-ray images to create a composite jaw structure model;

receiving a 3D photogrammetric rendering made by dental photogrammetry, wherein the 3D photogrammetric rendering contains the relative spatial positioning of the implant abutments;

receiving an intraoral topographic impression created by an intraoral scanning probe;

combining the 3D photogrammetric rendering, the intraoral topographic impression, and the composite jaw structure model to create an integrated 3D model of the patient's mouth and jaw.

16. The computer-readable medium of claim 15, wherein the step of combining the 3D photogrammetric rendering, the intraoral topographic impression, and the composite jaw structure model to create an integrated 3D model of the patient's mouth and jaw comprises:

combining the 3D photogrammetric rendering of the implant abutments with the intraoral topographic impression to create a composite intraoral/implant model;

combining the composite jaw structure model with the composite intraoral/implant model to create an integrated 3D model of the patient's mouth and jaw.

17. The computer-readable medium of claim 15, wherein the step of combining the 3D photogrammetric rendering of the dental abutments with the intraoral topographic impression involves the step of registering the position of the implant abutments.

18. The computer-readable medium of claim 15, wherein the step of combining the 3D photogrammetric rendering, the intraoral topographic impression, and the composite jaw structure model to create an integrated 3D model of the patient's mouth and jaw comprises:

combining the 3D photogrammetric rendering of the implant abutments and the composite jaw structure model to create a transitional model;

combining the intermediate model with the intraoral topographic impression to create an integrated 3D model of the patient's mouth and jaw.

19. The computer-readable medium of claim 15, wherein at least one bony alignment landmark and corresponding landmark is on a maxilla of the jaw, and wherein at least another bony alignment landmark and corresponding landmark is on a mandible of the jaw.

20. The computer-readable medium of claim 15, wherein the post-procedure jaw position is different from the pre-procedure jaw position.

* * * * *